June 15, 1937.  E. F. BRUNNER  2,084,077
VEHICLE WHEEL MOUNTING
Filed Sept. 16, 1926  3 Sheets-Sheet 1
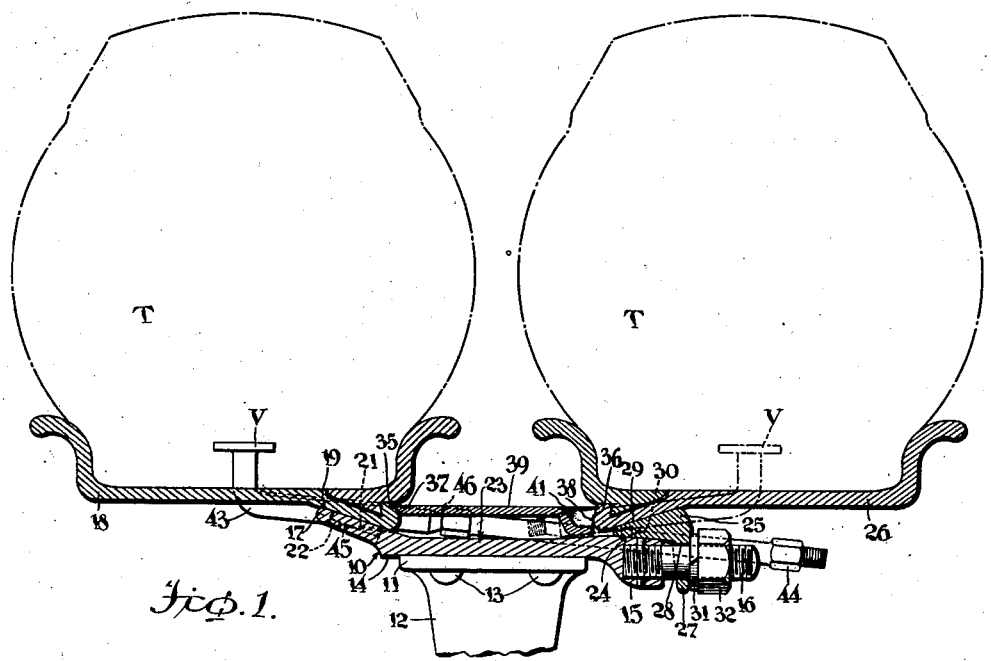
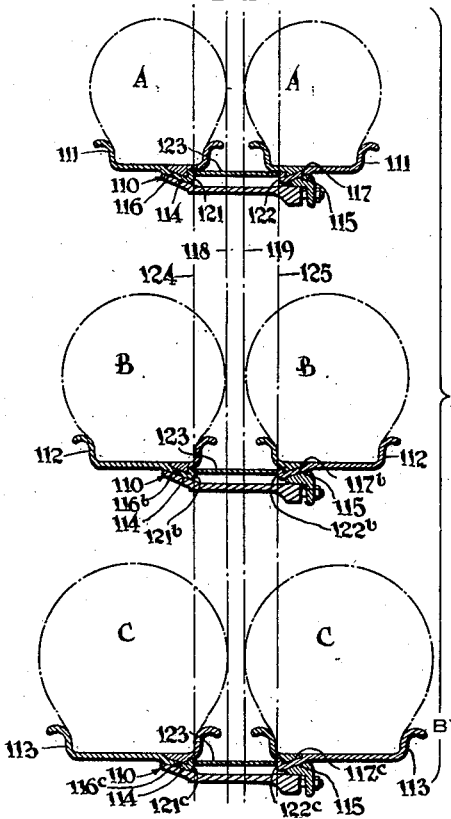
INVENTOR
Elmer F. Brunner,
BY
ATTORNEY

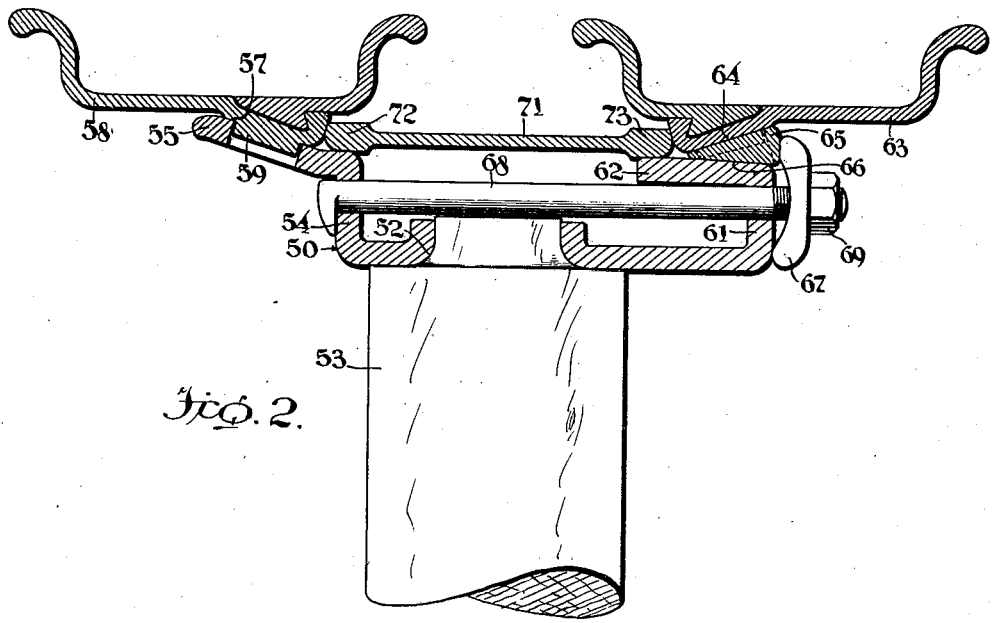

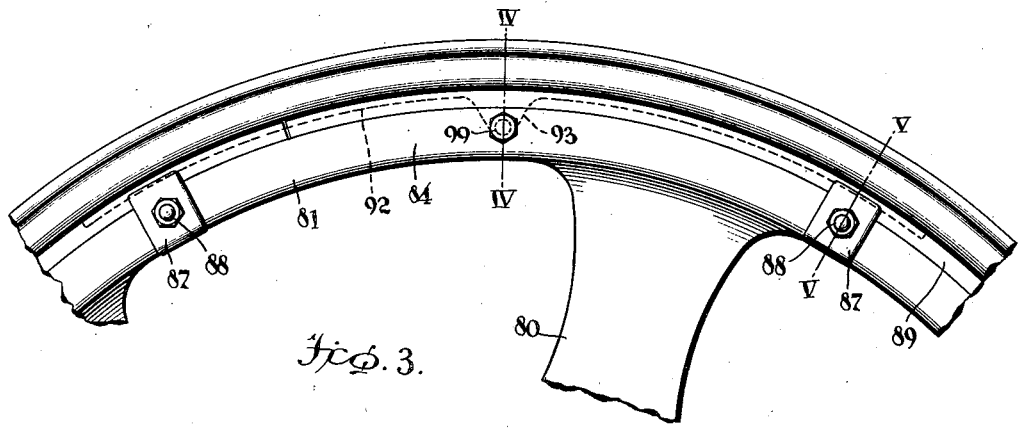
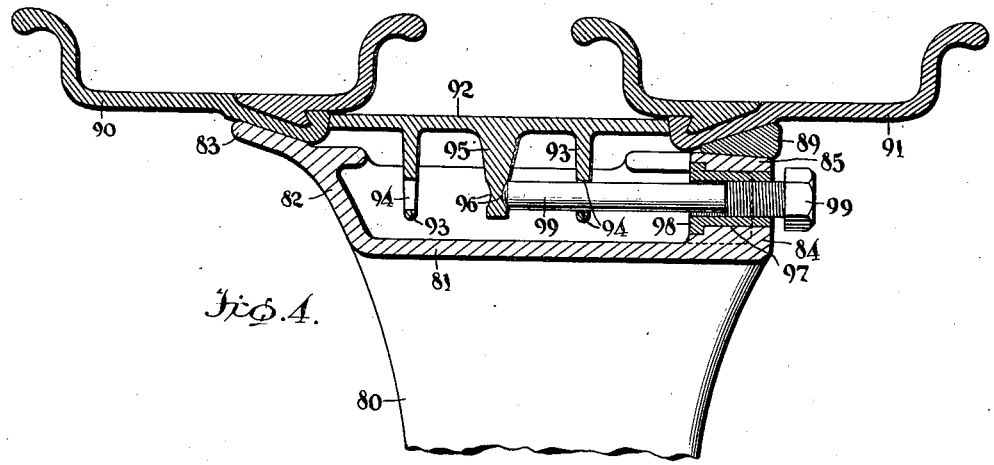
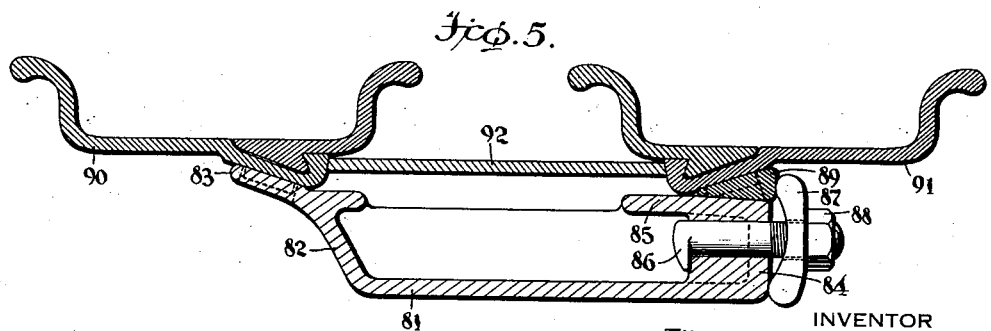

Patented June 15, 1937

2,084,077

UNITED STATES PATENT OFFICE 2,084,077

VEHICLE WHEEL MOUNTING

Elmer F. Brunner, Akron, Ohio, assignor to Wingfoot Corporation, Wilmington, Del., a corporation of Delaware Application September 16, 1926, Serial No. 135,848

4 Claims. (Cl. 301—13)

My invention relates to the mounting of vehicle wheels, and it has particular reference to a mounting wherein a plurality of resilient tires are supported upon a common wheel hub.

It is common practice to support the rear end of a motor driven road vehicle upon four resilient tires that are disposed in pairs upon either side of the frame, and which are operatively connected to aligned driving axles. While various mountings or assemblies of this character have been proposed and utilized, none of them, so far as I am aware, are free from all objections, and consequently are not entirely satisfactory in operation.

It is the primary object of the invention to provide an improved form of mounting of the class indicated. More specifically, the invention contemplates a mounting that shall be relatively inexpensive, light in weight, rugged in construction, and easy to assemble.

A further object of the invention resides in so organizing the components of the wheel assembly that various sizes of tires and rims may be positioned upon the felly band of the wheel, without altering the dimensions thereof.

Additional objects, and the advantages to be derived from a practice of the invention, will become apparent from a perusal of the following detailed description of various forms in which the principles of the invention may be incorporated, illustrated in the accompanying drawings, wherein:

Fig. 1 is a transverse cross-sectional view of a resilient tire assembly, illustrating a preferred form of construction;

Fig. 2 is a transverse cross-sectional view illustrating another form of mounting;

Fig. 3 is a fragmentary side elevational view of an additional type of mounting;

Fig. 4 is a cross-sectional view taken along the line IV—IV of Fig. 3;

Fig. 5 is a cross-sectional view taken along the line V—V of Fig. 3; and

Fig. 6 is a schematic illustration indicating the relation between the dimensions of the felly band and the rims adapted to receive tires of different sizes.

The mounting illustrated in Fig. 1 comprises a metal felly band 10, that is adapted to be secured to the outer portion 11 of a wheel member 12, by suitable means, such as bolts or rivets or depressions 13. The felly 10 is formed with an inner cylindrical face 14, that is adapted to contact with the portion 11 of the wheel member 12, and with an annular boss or flange 15 adjacent the outer edge thereof, to which is secured a plurality of locking bolts 16. The provision of a felly band of this contour is advantageous, not only in combination with a wheel having an outer supporting portion 11, but also for wheels of the artillery type, to which it is also adapted. It will be seen, therefore, that the provision of a felly band, serving as a base for the remaining parts of the mounting, admits of a ready replacement of a wheel of one type by a wheel of different configuration.

The inner portion of the felly 10 is provided with an outwardly extending tapered flange 17, that is adapted to serve as a support for a tire rim 18 formed on its inner circumferential surface with an inwardly projecting tapered bearing face or seat 19. Preferably the portion 19 of the rim 18 is formed with a plurality of inwardly projecting lugs 21 that are disposed in recesses 22, formed in the flange 17, to provide driving connections between the rim and the wheel when the parts are assembled in operative relation.

The mid-portion 23 of the outer surface of the felly 10 is preferably cylindrical, but the marginal seating portion 24 is slightly tapered, (at an angle of about five degrees), toward the axis of the wheel 12. This construction, while retaining the practical advantages resulting from the provision of a cylindrical surface on the outer periphery of the felly band, also facilitates the removal of a split wedge ring 25 that is disposed upon the tapered surface to serve as a support for a tire rim 26.

The wedge ring 25 is split transversely, in accordance with customary practise, and it is provided with inwardly extending and an integrally formed continuous flange 27 having apertures 28 adapted to receive the bolts or studs 16. It is apparent that instead of employing an integral flange 27, spaced lugs may be formed on the ring 25 to serve the same purpose. The outer surface of the ring 25 is tapered toward the medial plane of the wheel 12, and it provides a bearing face or seat for the rim 26, formed with a single beveled bearing surface 29, in all respects similar to the bearing surface 19 of the rim 18. A pin or lug 30 rigidly secured to the seating portion 24 is adapted to engage the tapered seat 29 to maintain the rim 26 spaced from the felly band while the wedge ring 25 is being mounted thereon. Suitable slots are provided in the ring 25 to receive the pin and to prevent the latter from interfering with proper axial movement of the ring, or the split ring 25 may be so positioned that the pin 30 is received between the end portions thereof at the split. Split washers 31 and nuts 32 are employed to secure the wedge ring 25 in position, and lugs (not shown), similar to the lugs 21, may be formed on the rim 26 to serve as driving connections.

The adjacent faces 35 and 36 of the rim bearing seats 19 and 29 are preferably slightly divergently tapered, to contact with the outer beveled surfaces 37 and 38 of a transversely split spacing band 39, by means of which the rims 18 and 26 are maintained in their proper positions. The member 39 is of annular configuration, and it is so dimensioned that it contacts with the flanges 35 and 36 adjacent the outer extremities thereof. The margin of the member 39 disposed near the outer rim 26 is depressed at spaced intervals, to form cup-shaped bearing portions 41 that engage the outer periphery of the felly band 10, to facilitate securing accurate alignment during the assembling of the rims.

Each rim 18 or 26 is adapted to receive a pneumatic tire T having a valve stem V projecting inwardly through a suitably disposed aperture formed in the rim. The valve stem of the inner tire is bent toward the outer surface of the vehicle wheel, as indicated at 43, and it is connected to a leader 44 that is disposed adjacent the felly band 10. In order that there may be no binding of the parts due to the positioning of the leader 44, the felly band 10 and the spacing ring 39 are provided with slots, respectively indicated at 45 and 46, which provide the necessary clearance for the valve stem and its associated member 44. The valve stem V shown in conjunction with the rim 26 is normally disposed 180° from the valve stem of the other rim 18. Since the rims 18 and 26, together with the valve stems, are of identical construction, the leader 44 is adapted to be secured either to the one valve stem or to the other. Also the valve stem V of the outer rim 26 may extend inwardly or outwardly. For the purpose of receiving the valve stem extending inwardly, as illustrated, suitable slots similar to those indicated at 45 and 46 are provided in the ring and felly elements.

To assemble the mounting, the inner rim 18 with its associated tire is slipped over the felly band 10 until the seat 19 is disposed upon the tapered flange 17. The lugs 21 and recesses 22 serve to hold the rim 18 in proper position while the remaining elements of the assembly are being mounted. The spacing ring 39 is pressed against the flange 35 of the rim 18, and it is properly positioned by means of the contacting faces 35 and 37 and the depressed portions 41. The rim 26 is then so mounted upon the felly 10 that it partially rests upon the spacing pin 30, the wedge ring 25 is inserted, and the entire assembly is rigidly secured by tightening the nuts 32 upon the threaded studs 16.

It will be observed that the assembling operation is rapidly and easily performed, and that the mounting is properly aligned and is rigidly secured against displacement.

The mounting shown in Fig. 2 comprises a felly band 50 that is provided with a cylindrical base portion 51 formed with a plurality of apertures 52 for the reception of the spokes 53 of an artillery type wheel. A radially disposed flange 54, formed on the inner side of the felly band 50, merges into an outwardly extending tapered flange 55, that serves as a fixed bearing seat for a beveled portion 57 formed on a rim 58. Driving lugs 59 are provided between the rim 58 and the flange 55 in a manner similar to that previously described.

The outer portion of the felly band 50 is provided with a radially disposed flange 61 that is bent inwardly toward the medial plane of the wheel to provide a bearing seat 62 for the outer tire supporting rim 63. This rim is also provided with a beveled seat 64 disposed upon its inner circumferential surface, that is adapted to contact with a wedge ring 65. The portion of the flange 62 that supports the wedge ring 65 is slightly tapered, as indicated at 66, to prevent binding of the parts.

The rims 58 and 63 are respectively positioned upon the flanges 55 and 62 in substantially the same manner as that described in connection with the assembly illustrated in Fig. 1. The wedge ring 65, however, is not provided with integrally formed clamping lugs, but detachable lugs 67 are employed, which abut the ring 65 and the radially inward portion of the flange 61. Bolts 68, extending between the flanges 54 and 61, project through apertures formed in the clamping lugs 67, and nuts 69 are utilized to maintain the parts in proper relation.

The rims 58 and 63 are held in spaced relation by means of an annular ring 71 formed with tapered side surfaces that are adapted to contact with the seat forming portions of the rims. The ring 71, unlike the ring 39 employed in the previously described mounting, is provided with enlarged marginal portions 72 and 73 that respectively bear against the flanges 55 and 62 to facilitate proper alignment of the rims.

While this construction differs in various details from that shown in Fig. 1, it will be seen that the same inventive principles are incorporated in both mountings. The felly band is adapted to be disposed on various types of wheels without alteration of its contour, and the rims may be interchanged with others of different style or dimensions. Each mounting includes a plurality of wheel rims that are positively spaced and which are held in operative relation by means of a single set of bolts and lugs.

The assembly illustrated in Figs. 3, 4 and 5, is similar in many respects to that shown in Fig. 2, but it differs primarily in that auxiliary means are provided to effect minute compensations for looseness or play in the inner rim. To emphasize the features of interchangeability and adaptability of the felly bands, the mounting is illustrated as applied to a cast metal wheel 80, the outer portion of which is integrally connected to a felly band 81.

The base portion of the felly 81 serves as a bridging member for a pair of outwardly extending flanges 82 and 84, the inner one 82, merging into an outwardly extending tapered rim supporting seat 83. The outer flange 84 is provided with an inwardly extending portion 85, that is slightly tapered toward the axis of the wheel, for the purposes previously indicated. Threaded studs or bolts 86, that may be formed integrally with the flange 84, project therebeyond for the reception of clamping lugs 87 and securing nuts 88, by means of which a wedge ring 89 is secured on the felly. Tire supporting rims 90 and 91, of the same type as that previously described, are positioned upon the flange 83 and the ring 89 in a manner that is now apparent from the foregoing description directed to the forms illustrated in Figs. 1 and 2.

The rims are spaced and are held in aligned relation by means of segmental arcuate plates 75

92 that preferably are so dimensioned that they contact with the rims 90 and 91 near the outer portions of the beveled seats, as described in connection with the construction shown in Fig. 1. Each plate 92 is provided on its inner circumferential surface with spaced and aligned inwardly extending lugs 93, having aligned apertures 94 formed therein, and with a centrally disposed inwardly projecting lug 95 that is provided with concave recesses 96 aligned with the apertures 94.

A plurality of apertures 97 corresponding in number to the number of segmental plates 92, are provided in the flange 84, and in each of them is rigidly secured an internally threaded bushing 98, that is adapted to receive a headed screw-threaded bolt 99. The bolts 99 are interspersed with the studs 86, and they are adapted to project through the apertures 94 and to bear against the concave recesses 96 of the lugs 95.

In assembling this type of mounting, the rim 90 is positioned upon the flange 83, and the plates 92 are fitted around the periphery of the felly band, being held in position by means of the bolts 99 which are inserted through the apertures 94. The outer rim 91 is then disposed on the wedge ring 89, and the assembly is tightened in the usual manner. An independent adjustment may be effected on the inner rim, by tightening the bolts 99, thereby exerting pressure upon the lug 95 of the spacing member 92. By the provision of the concave bearing recess 96 and the loose fit of the bolts 99 within the apertures 94, a limited pivotal movement of the members 92 is permitted, and hence minute irregularities in the alignment of the rims may be corrected.

The advantageous features of interchangeability and ease of assembly have also been incorporated in this mounting, and it is apparent that it has other features in common with the previously described constructions. Moreover, the assembly shown in Fig. 3 possesses the feature of independent adjustment of the inner tire supporting rim.

As further indicative of the interchangeability of the rims, particularly those of the same style but of different dimensions, there is shown schematically in Fig. 6 a plurality of mountings having a felly band 110 of constant shape and size, and rims that vary in width. The beveled seating portions of the rims that are adapted to receive tires of different sizes are so disposed, relative to the flanges of the rims, that a constant distance is maintained between the adjacent inner portions of the tires, while the overall transverse dimension is correspondingly altered. This arrangement maintains a substantially invariable distance between the inner faces of the tires, and hence conforms to the standards adopted by manufacturers.

The pairs of tires A, B, and C are drawn on a scale proportionate to tire sizes having diameters of six, seven and eight inches, and they are respectively mounted upon rims 111, 112 and 113, that have equal inside diameters, but whose width between the bead engaging flanges varies in accordance with the dimensions of the tires. Since the felly band 110 is invariable in its dimensions, it follows that the rim-receiving seats 114 and 115 formed thereon must also be always spaced the same distance. The annular tapered seats 116 and 117 that are respectively formed on the rims 111, 112 and 113 must also be so positioned as to align with the felly band seats 114 and 115, and this relation may be expressed by stating that the position of the seats 116 and 117 varies, relative to the size of tire, with respect to the bead retaining flanges of the rims.

The actual dimensions of the component parts of the rims, and their relative positions, may readily be determined by fixing the distances between the tires, as indicated by the distance between the parallel broken lines 118 and 119. The distance between the seats 114 and 115 on the felly band 110 is also fixed, and hence the positions of the rim seats 116 and 117 may be immediately determined. With the type of rim illustrated, it will be found that the rim seat does not coincide with the center line of the tire, but that it is disposed inwardly thereof toward the medial plane of the mounting.

To prevent unnecessary duplication of parts, the inner flanges 121 and 122 of the seating portions 116 and 117 on the rims 111 are also so positioned that a constant distance is maintained between them, in the same manner that a constant distance is maintained between the tapered portions 116 and 117 of the rims 111. The spacing ring 123 is then adaptable to tire mountings wherein the tires may be of different dimensions. This constant distance is indicated by the distance between the parallel lines 124 and 125.

The same method of determining the positions of the rim seats on the rims 112 and 113 is employed for mountings incorporating the corresponding sizes of tires, and hence further description is unnecessary. The related parts are indicated by the same numerals as those employed in connection with the description of the smaller size of tires, being distinguished by the letters b and c.

From the foregoing description, it will be apparent that the invention contemplates a strong and durable mounting for pairs of tires, that the parts may be made at a low cost, and that they may readily be assembled. The invention also contemplates a type of mounting wherein tires of other sizes than those originally specified may be employed, with a minimum of expenditure to obtain new parts of proper dimensions. Those skilled in the art may resort to modifications of the constructions described to illustrate the principles of the invention, and hence it is intended that the scope of the invention should be determined only by the limitations set forth in the following claims.

What I claim is:

1. In combination a continuous felly wheel, an inclined seat of gradually greater diameter on the inboard side of the felly wheel, a single bevel rim engaging with the seat and extending laterally inboard of the felly wheel, a wedge ring on the outboard side of the felly wheel, an oppositely turned single bevel rim engaging with the wedge ring and extending laterally outboard of the felly wheel, an endless spacer ring having a close sliding fit on the felly wheel and positioned between the rims and removable means clamping the wedge ring against the outboard rim bevel, the rim against the spacer ring, and the ring against the inboard rim.

2. In combination a continuous felly wheel, an inclined seat of gradually greater diameter on the inboard side of the felly wheel, a rim engaging with the seat, a wedge ring on the outboard side of the felly wheel, a rim engaging with the wedge ring, an endless spacer ring having a close sliding fit on the felly wheel and positioned between the rims and removable means clamping the wedge ring against the outboard rim bevel, the rim against the spacer ring, and the ring against the inboard rim.

3. A vehicle wheel comprising a continuous tapered axially inner seat at its outer periphery; an inner rim engaging said inner seat; an outer rim arranged on the periphery; an endless ring having a close sliding fit on the wheel and positioned between the rims and means engaging only the outer rim for clamping the outer rim against the ring and the ring against the inner rim and the inner rim on its seat.

4. A vehicle wheel comprising a continuous tapered axially inner seat at its outer periphery; an inner rim engaging said inner seat; an outer rim arranged on the periphery; an endless ring having a close sliding fit on the wheel and positioned between the rims and means clamping the outer rim against the ring and the ring against the inner rim and the inner rim on its seat.

ELMER F. BRUNNER.